Patented Aug. 23, 1938

UNITED STATES PATENT OFFICE 2,128,208

ALKOXY DERIVATIVES OF METHACRYLIC ACID ESTERS AND METHOD OF PRODUCING THEM

Ralph A. Jacobson, Wilmington, Del., assignor to E. I. du Pont de Nemours & Company, Wilmington, Del., a corporation of Delaware No Drawing. Application February 27, 1937, Serial No. 128,228

12 Claims. (Cl. 260—49.1)

This invention relates to improved processes for preparing certain methacrylic acid derivatives and to the products obtained thereby. More particularly it relates to an improved process for preparing alkoxy dimers of methacrylic acid esters and to said dimers. Still more particularly it relates to an improved method for preparing isoalcohol dimers of isoalkyl methacrylates. Specifically, it relates to an improved method for preparing isobutoxy dimers of isobutyl methacrylate.

An object of this invention is to provide an improved method for preparing alkoxy dimers of methacrylic acid esters. Still another object is to provide certain catalysts which orient the reaction toward dimer formation. A further object is to provide new and useful dimers of beta-alkoxy isobutyrates.

The above and other objects are accomplished by refluxing anhydrous monohydric alcohols containing less than 9 carbon atoms with monomeric esters of methacrylic acid in the presence of catalytic proportions of an alkali metal and/or a substance selected from the group of partially oxidized pinene, aged paraldehyde, and ascaridole (a naturally occurring terpene peroxide), neutralizing the reaction mixture with aqueous acid, removing and purifying the non-aqueous layer, and separating the reaction mixture into its component parts by fractional distillation.

In the preferred embodiment of the invention, the reactions are carried out in the presence of catalysts of the aforementioned type and with isoalcohols and the corresponding iso-alcohol methacrylates, especially with isobutanol and isobutyl methacrylate.

It has been found that useful new compositions of matter can be prepared by condensing esters of methacrylic acid with alcohols containing less than 9 carbon atoms under substantially anhydrous conditions and in the presence of catalytic proportions of metallic sodium and/or a substance selected from the class of aged paraldehyde, partially oxidized pinene, and ascaridole. In the practice of the invention the reaction mixture is refluxed for several hours, dilute aqueous acid is then added until the mixture is substantially neutral, the water-insoluble layer separated, washed with water, dried, and then fractionally vacuum distilled. After the first cut which consists of unchanged reactants has been removed, a low boiling monomeric fraction consisting substantially of a beta-alkoxy isobutyrate is collected, and finally a higher boiling fraction consisting of an alkoxy dimer of the methacrylic acid ester.

By "aged paraldehyde" is meant paraldehyde which has been allowed to stand exposed to the air at about 25 to 30° C. for several months. By "partially oxidized pinene" is meant pinene through which air has been passed at about 80° C. for about seven hours. These catalysts probably contain active agents of a peroxide nature which are the real catalysts; the exact nature of the active agent is not known, however. In aged paraldehyde they may be peracids, entirely or in admixture with peroxides of a less acidic nature.

The process described herein is particularly adapted to the production of dimers from isoalcohols and isoalcohol methacrylates, especially from isobutanol and isobutyl methacrylate since better yields are obtained therefrom than from others alcohols and methacrylates. Thus, from methyl methacrylate and methanol only relatively small amounts of the dimer are obtained, whereas from methyl methacrylate and isobutanol fairly good yields of dimer are obtained. So far as I know, any alcohol and any methacrylic acid ester will, when reacted according to this invention, yield both monomer and dimer although in varying proportions depending upon the particular alcohol and ester employed.

It has also been discovered that within limits the reaction can be oriented in the direction of monomer or dimer formation depending on the conditions. Thus, the yield of monomer may be increased by adding larger proportions of sodium to the reaction mixture at intervals, e. g., by adding about 0.25 mol. of sodium per mol. of methacrylic acid ester at the beginning of the reaction, and about 0.25 mol. additional when the reaction period is about half over.

The invention may be illustrated but not limited by the following examples, in which the parts are by weight unless otherwise indicated.

Example I

Two and three-tenths parts of metallic sodium were dissolved in 148 parts of anhydrous isobutanol and to the resulting solution were added 142 parts of monomeric isobutyl methacrylate and one part of paraldehyde which had been exposed to the air at room temperature in diffused light for approximately six months. The solution was well stirred and heated at 110 to 120° C. for eight hours, allowed to cool overnight, cold 10% aqueous sulfuric acid then added in an amount sufficient to make the solution slightly acid, the non-aqueous upper layer separated, washed with water, and dried over anhydrous sodium sulfate. The reaction products were separated by fractional distillation whereupon 17 parts of unchanged reactants boiling below 70° C. at 20 mm., 16 parts of isobutyl beta-isobutoxy isobutyrate boiling at 80 to 100° C. at 2 to 3 mm., and 105.5 parts of the isobutoxy dimer boiling at 140 to 170° C. at 2 to 3 mm. were collected. There remained in the flask 6 parts of a higher boiling residue which was probably polymerized isobutyl methacrylate.

The isobutoxy dimer was subjected to hydrolysis and the acid isolated gave the following analytical data:

| | |
|---|---|
| Carbon | 63.27% |
| Hydrogen | 8.65% |
| Neutral equivalent | 226.00 |

Example I was repeated in the absence of aged paraldehyde. The yields of isobutyl beta-isobutoxy isobutyrate and of isobutoxy dimer obtained were 19 and 72 parts, respectively. The higher boiling residue remaining in the distilling flask corresponded to about 26.4 parts.

Example II

Example I was repeated, using partially oxidized pinene instead of the aged paraldehyde. The yields of isobutyl beta-isobutoxy isobutyrate and of isobutoxy dimer were 18.4 and 9.7 parts, respectively. The higher boiling residue in the distilling flask corresponded to about 9 parts.

The partially oxidized pinene used in the above example was prepared as follows:

In a one liter flask equipped with an efficient sweep-type stirrer, a condenser, and an inlet tube leading to the bottom of the flask was placed 500 cc. of freshly distilled pinene, B. P. 156–7° C. The flask was heated in a water-bath held at 95° C. and a slow stream of air was blown into the flask with vigorous stirring. After 15 hours the reaction was stopped. A loss of 20 cc. (4%) had occurred. The peroxide content of the sample was 6 to 7%.

The concentration of peroxide reaches a maximum in 8 to 16 hours, beyond which time further blowing has little effect. By vacuum distillation, however, unchanged pinene may be removed yielding a very active concentrate as a residue.

Pinene may also be activated by shaking with Superoxol (30% $H_2O_2$), though from a practical point of view air oxidation seems better.

Example III

To a solution of 5.75 parts of sodium in 148 parts of dry isobutanol is added one part of aged paraldehyde and then 142 parts of monomeric isobutyl methacrylate. The mixture is refluxed gently for 4 hours and then 5.75 parts of sodium added. The refluxing is continued for 4 more hours, then the mixture is neutralized with 10% sulfuric acid, washed with water, and dried over anhydrous sodium sulfate. The product is distilled through a fractionating column, the unchanged isobutyl methacrylate and isobutyl alcohol being first removed by distillation at atmospheric pressure, and the residue in vacuo. The fraction boiling at 80 to 100° C. at 2 mm. is isobutyl beta-isobutoxy isobutyrate and the one boiling at 140–180° C. at 2 mm. consists mainly of the isobutoxy dimer. The yield of isobutyl beta-isobutoxy isobutyrate is 56 parts and of the isobutoxy dimer 36 parts. In addition there remains about 20 parts of a residue in the flask.

Example IV

To 5 parts of metallic sodium dissolved in 150 parts of anhydrous methanol were added 250 parts of monomeric methyl methacrylate, and 2.5 parts of aged paraldehyde. The solution was gently refluxed for 6 hours, allowed to cool, acidified with dilute sulfuric acid, and diluted with 100 parts of water. The water-insoluble layer was removed, and the water layer extracted with 35 parts of ether. The combined extract and separated portion were dried over anhydrous calcium chloride and then fractionally distilled. The main fraction (153 parts) came over at 58 to 61° C. at 29 mm. Analysis of the product showed it to be methyl beta-methoxy isobutyrate (carbon 54.69%; hydrogen, 9.21% as compared with a calculated value of carbon and hydrogen of 54.54% and 9.09%, respectively) $N_D^{20}$ 1.4070; $D_4^{20}$ 0.9767. A smaller fraction amounting to 33 parts and boiling at 108° C. at 2 mm. was also obtained. Analytically this compound corresponds to a dimer of methyl methacrylate containing one molecule of methanol.

The analytical data for this dimer were as follows:

| | |
|---|---|
| Carbon | 57.02% |
| Hydrogen | 8.85% |
| Molecular weight | 222.00 |
| $N_D^{20}$ | 1.4375 |
| $D_4^{20}$ | 1.0560 |

Saponification of the above dimer was accomplished by refluxing with an aqueous-alcoholic solution of potassium hydroxide followed by acidification of the alkaline solution and subsequent extraction of the acid with ether. The acid thus obtained was distilled (B. P. 131–134° C. at 3 mm.), and analyzed with the following results.

| | | |
|---|---|---|
| Carbon | percent | 58.11 |
| Hydrogen | do | 7.57 |
| Neutral equivalent | | 101.00 |
| Molecular weight | | 192.00 |

Example V

To a solution of 2.3 parts of metallic sodium in 185 parts of dry isobutanol were added 1 part of aged paraldehyde and 100 parts of monomeric methyl methacrylate. The mixture was refluxed gently for 5.5 hours, then neutralized with 10% sulfuric acid, washed with water, dried over potassium carbonate, and then fractionally distilled. The unchanged methyl methacrylate and isobutyl alcohol were first removed by distillation at atmospheric pressure and the residue distilled in vacuum. The fraction boiling at 76 to 78° C. at 2 mm. was largely a mixture of methyl beta-isobutoxy isobutyrate and isobutyl beta-methoxy isobutyrate, and the fraction boiling at 152 to 162° at 2 mm. was a mixture of methoxy and isobutoxy dimers of methyl and isobutyl methacrylates.

Other alkoxy dimers may be prepared by the process outlined in the examples. Methyl methacrylate may be treated with beta-methoxy ethanol and with the mixed alcohols (boiling range 135 to 150° C.) formed in the methanol synthesis by catalytic reduction of the oxides of carbon (containing about 15% of diisopropyl carbinol and about 75% of 2-methyl pentanol-1), more or less of the expected alkoxy monomers and dimers being obtained in each case. Similar products may be obtained from cyclohexanol and cyclohexyl methacrylate and from propanol and propyl methacrylate.

Among suitable alcohols which may be employed in the practice of the present invention in addition to those mentioned in the examples are such isoalcohols as isopropyl, isoamyl, etc., other alcohols such as ethyl, propyl and the various hexyl, heptyl, and octyl alcohols, para-tolyl carbinol, beta-methoxy ethanol, etc., may also be used, however, if desired. When such alcohols are employed, they not only condense with the methacrylic acid ester to form alkoxy monomers and dimers but they also replace the alcohol radicals in the ester by ester interchange. Accordingly, when alcohols other than the ones with which the methacrylic acid ester is esterified are employed, reaction products may be obtained which consist of various monomeric beta-alkoxy isobutyrates and the corresponding alkoxy dimers.

Among suitable methacrylic acid esters which may be employed in this invention may be mentioned, ethyl, propyl, butyl, amyl, isoamyl, hexyl, octyl, dodecyl, cyclohexyl, benzyl, etc. They are all employed, of course, in their monomeric form.

It is to be understood that while experimental evidence indicates that the compositions of matter described herein are esters of alkoxy isobutyrates and alkoxy dimers of methacrylic acid esters, the invention is not to be limited by any explanation or theory as to the nature of the reaction products but only by the description of their properties and the method used in their preparation.

Other metallic elements such as lithium potassium, rubidium, and caesium may be used as part or total substitutes for the metallic sodium of the examples. The proportions of alkali metals which are preferably used are given in the examples and in the foregoing description of the invention, but may be varied over considerable range as from about 0.01 to about 5.0% per mol. of methacrylic acid ester.

The alcohol and the methacrylic acid esters employed in this invention should be substantially anhydrous for otherwise the alkali metal reacts with the water to form alkali metal hydroxides. The proportion of alcohol and methacrylic acid ester may be varied as desired, but it is generally preferred to use a considerable excess of the alcohol. In the practice of the invention it is preferred to employ molar ratios of alcohol to methacrylic acid ester in excess of 1:1.

If desired, the reaction may be carried out in the presence of inert solvents such as the aliphatic, aromatic, or cycloaliphatic hydrocarbons, but the use of such solvents has no particular advantage.

Although the reaction period may be varied over a considerable range, it should generally be of about 4 to 8 hours duration. It is not necessary to reflux the reaction mixtures, since the reaction proceeds at lower temperatures but at a slower rate. If desired, the free acid may be prepared from the alkoxy monomers and dimers by the usual methods.

In the practice of this invention, the reaction is conducted at atmospheric pressure, but if desired, either sub- or superatmospheric pressures may be used.

It is to be understood that the aged paraldehyde, ascaridole and oxidized pinene catalysts described herein may be employed in either lower or higher concentrations relative to the methacrylic acid ester than those disclosed in the foregoing description. As little as 0.01% may be useful, and in some cases it may be advantageous to employ as much as 5% thereof or even more. It is to be understood however, that these catalysts may be prepared by methods other than those indicated herein.

In place of the pinene and paraldehyde of the examples, a naturally occurring terpene peroxide such as ascaridole may be used.

Both the monomeric and dimeric compositions described herein are useful as plasticizers for natural and synthetic resins such as polymerized methyl methacrylate, etc., and for cellulose derivatives, especially cellulose acetate. The free acids obtained therefrom are also useful as solvents, resin intermediates, modifying agents for fatty oils, etc. The dimeric compositions are the more useful for these purposes because of their higher boiling points. If desired, the reaction mixture obtained by the process described herein may be used for many of these purposes without separating the low and high boiling fractions.

From a consideration of the above description it will be appreciated that many changes may be made in the processes disclosed without departing from the invention or sacrificing any of the advantages that may be derived therefrom.

I claim:

1. In a process for the preparation of alkoxy derivatives of methacrylic acid esters, the steps which comprise reacting an aliphatic monohydric alcohol containing less than 9 carbon atoms with a monomeric ester of methacrylic acid in the presence of an alkali metal and a compound selected from the group consisting of partially oxidized pinene, aged paralydehyde, and ascaridole and subsequently isolating the alkoxy derivatives of the methacrylic acid ester from the reaction products.

2. The process according to claim 1, conducted by refluxing under atmospheric pressure for a period ranging up to about 8 hours.

3. The process according to claim 1 conducted in the presence of from about 0.01% to about 5% of metallic sodium as a catalyst per mol of methacrylate acid ester.

4. The process according to claim 1 in which the ratio of alcohol to ester is not less than about 1:1.

5. The process according to claim 1 in which the dimer of the alkoxy derivative of methacrylic acid is isolated from the reaction products by fractional distillation at subatmospheric pressures.

6. The process according to claim 1 in which the alcohol is an isoalcohol.

7. In a process for the preparation of the isobutoxy dimer of isobutyl methacrylate, the steps which comprise reacting isobutyl alcohol and isobutyl methacrylate in the presence of an alkali metal catalyst and a substance of the group consisting of partially oxidized pinene, aged paraldehyde, and ascaridole and subsequently isolating from the reaction products the isobutyl beta-isobutoxy methacrylate dimer.

8. The process according to claim 7 in which the ratio of alcohol to ester is not less than 1:1.

9. The process which comprises reacting an excess of isobutanol with isobutyl methacrylate by refluxing in the presence of an alkali metal and a compound selected from the group consisting of partially oxidized pinene, aged paraldehyde, and ascaridole, neutralizing the free alkali metal, separating, drying, and fractionally distilling the non-aqueous upper layer to isolate the dimeric products.

10. The dimer resulting from the interaction of an isoalcohol with a monomeric isoalkyl methacrylate in accord with the process of claim 9.

11. The dimer resulting from the interaction of isobutyl alcohol and monomeric isobutyl methacrylate in accord with the process of claim 9.

12. The reaction product boiling between 140 and 170° C. at 2 to 3 mm. and obtained in accord with the process of claim 9.

RALPH A. JACOBSON.